United States Patent
Tewani et al.

(10) Patent No.: US 6,848,682 B2
(45) Date of Patent: Feb. 1, 2005

(54) BI-STATE HYDRAULIC MOUNT

(75) Inventors: Sanjiv G. Tewani, Lebanon, OH (US); Mark W. Long, Bellbrook, OH (US); Mark O. Bodie, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 21 days.

(21) Appl. No.: 10/361,054

(22) Filed: Feb. 7, 2003

(65) Prior Publication Data

US 2003/0151179 A1 Aug. 14, 2003

Related U.S. Application Data

(60) Provisional application No. 60/355,671, filed on Feb. 7, 2002.

(51) Int. Cl.[7] .............................................. F16F 13/00
(52) U.S. Cl. ............................ 267/140.15; 267/140.14; 267/141.5
(58) Field of Search ...................... 267/140.11, 140.13, 267/140.14, 140.15, 141.3–141.5, 219, 136, 140.3, 140.4; 248/562–3, 636, 638; 180/300, 312, 902; 188/266.3, 266.4, 322.13, 290

(56) References Cited

U.S. PATENT DOCUMENTS

| | | | | |
|---|---|---|---|---|
| 4,648,576 A | * | 3/1987 | Matsui ................... | 267/140.14 |
| 4,699,099 A | * | 10/1987 | Arai et al. ............... | 123/192.1 |
| 4,789,143 A | * | 12/1988 | Smith et al. ........... | 267/140.14 |
| 4,802,648 A | * | 2/1989 | Decker et al. .............. | 248/550 |
| 6,357,730 B1 | * | 3/2002 | Gugsch et al. ......... | 267/140.15 |
| 6,547,226 B2 | | 4/2003 | Shores et al. | |

* cited by examiner

Primary Examiner—Robert A. Siconolfi
Assistant Examiner—Melanie Torres
(74) Attorney, Agent, or Firm—Michael D. Smith

(57) ABSTRACT

A hydraulic mount provides active control through the use of a rotary track assembly connecting a primary pumping chamber of the mount to a secondary fluid chamber. With low amplitude vibrations the fluid path remains open, providing low dynamic stiffness. For high amplitude vibrations, the fluid flow path is closed, providing a high level of dynamic stiffness. The rotary track assembly control is continuously variable offering a wide range of active control of hydraulic mount stiffness.

12 Claims, 3 Drawing Sheets

BI-STATE HYDRAULIC MOUNT

RELATED APPLICATIONS

This application claims priority to U.S. Provisional Patent Application No. 60/355,671 filed Feb. 7, 2002, titled Bi-State Hydraulic Mount by Sanjiv G. Tewani et al.

TECHNICAL FIELD OF THE INVENTION

This invention relates, generally, to hydraulic powertrain mounts of the type used in motor vehicles, and more particularly to bi-state hydraulic mounts.

BACKGROUND OF THE INVENTION

It has long been the practice in motor vehicles, such as automobiles and trucks, to suspend engines, and other heavy components that generate vibrations when operating, on resilient mounts that isolate and damp the vibration from reaching the passenger compartment of the vehicle. It is desirable in such circumstances to provide a mount that is relatively soft for low amplitude higher frequency vibrations, such as those produced while an engine is operating at idle speed or at a constant speed while the vehicle is cruising along on a smooth road. Making the mount too soft, however, results in a structure that may not be capable of damping the motion of a heavy mass, such as the engine, when the vehicle is traveling over a bumpy road.

The competing requirements for a mount that is soft enough to isolate low amplitude vibrations generated by an engine at idle, and yet is robust enough to damp and limit the movement of an engine relative to the vehicle chassis when the vehicle is encountering a bumpy road surface, have caused the designers of resilient mounts to employ hydraulic fluid flowing between multiple chambers within the mount, together with judiciously sized orifice tracks and fluid valve arrangements providing fluid communication between the chambers, to provide mounts that exhibit different damping performance dependent upon the magnitude and frequency of the vibratory input to the mount, without any active external control of fluid flow between the various chambers. Such mounts are known as passive hydraulic mounts. However, in trying to achieve a balance between controlling high frequency vibrations and low frequency vibrations, the range of damping possible with passive hydraulic mounts is reduced.

One method of broadening the range of frequencies a mount is effective over is by employing an active control mount. Active control mounts include an electrically activated control to dynamically change the damping ability of a mount. Often, though, these mounts are costly and complex, leading to significant restrictions in the number of applications within which the mount can be employed.

What is desired, therefore, is an improved bi-state hydraulic mount that overcomes these and other disadvantages.

SUMMARY OF THE INVENTION

The present invention provides a hydraulic mount including a resilient hollow body defining a primary fluid chamber and a secondary fluid chamber, a rotary track assembly separating the primary and secondary fluid chambers and a rotary actuator operably connected to the rotary track assembly. The rotary track assembly includes an orifice plate having a plurality of openings, a containment plate securely attached to the orifice plate, and including a wall having a plurality of tab portions that define a plurality of fluid chambers. The rotary track assembly further includes a rotary track disposed between and rotatably coupled to the orifice plate and the containment plate, the rotary track having a wall portion and a base portion, the wall portion including a first plurality of openings and the base portion including a second plurality of openings.

Another embodiment of the invention provides a method for operating a hydraulic mount having a resilient hollow body defining a primary fluid chamber, a secondary fluid chamber, a rotary track assembly having a rotary track providing fluid communication between the primary chamber and the secondary chamber, and a rotary actuator, the method comprising sensing an amplitude vibration, receiving the sensed vibration at the controller, sending a signal to the rotary actuator and rotating the rotary track based on the received amplitude vibration. The method further includes rotating the rotary track to an open position in response to a low amplitude vibration and rotating the rotary track to a closed position in response to a high amplitude vibration.

The foregoing and other features and advantages of our invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

DETAILED DESCRIPTION

Figure 1B:
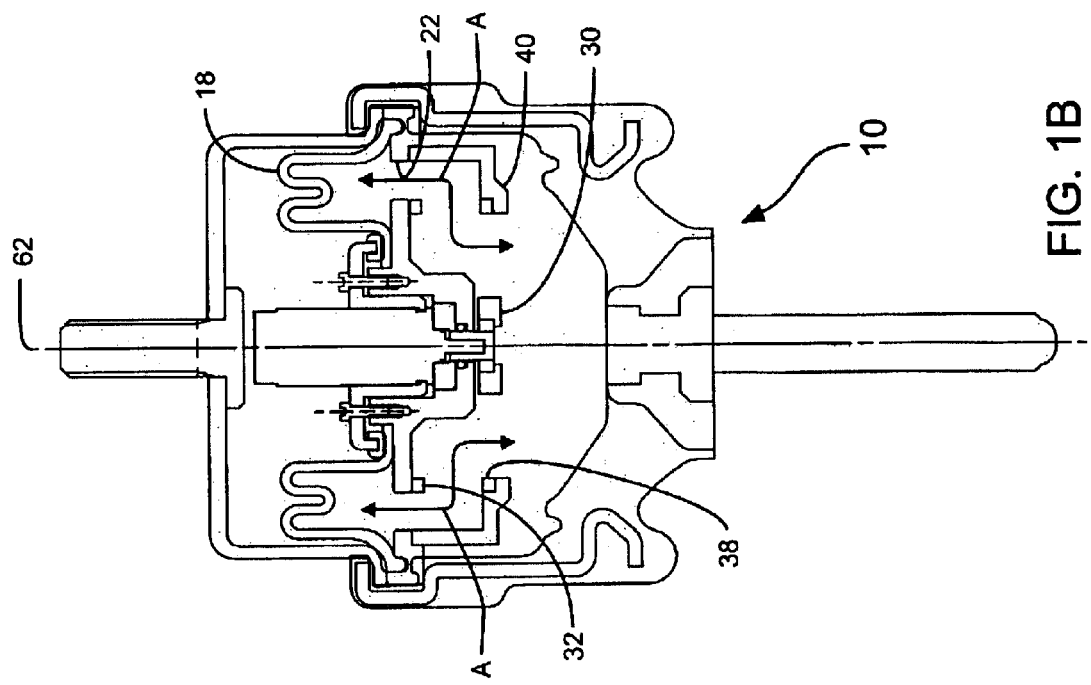
FIG. 1B is a cross section, illustrating the bi-state hydraulic mount if FIG. 1A in the open position, in accordance with the invention.
Figure 1A:
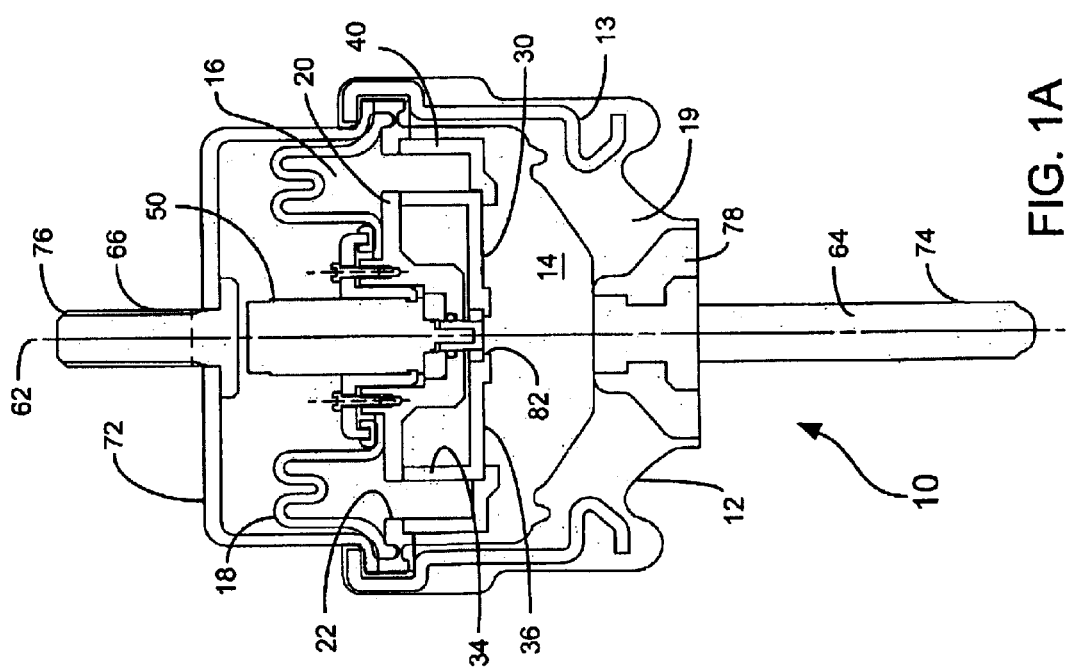
FIG. 1A is a cross section, illustrating one embodiment of a bi-state hydraulic mount in the closed position, in accordance with the invention.

FIGS. 1A and 1B illustrate an exemplary embodiment of a bi-state hydraulic mount 10, according to our invention. FIG. 1A illustrates mount 10 in a closed position and FIG. 1B illustrates mount 10 in an open position. Hydraulic mount 10 includes a resilient hollow body 12 defining a primary fluid (pumping) chamber 14, and a secondary fluid (reservoir) chamber 16 separated from one another by a rotatable track assembly 15. Fluid chambers are filled with an incompressible hydraulic fluid such as, for example, glycol. Resilient hollow body 12 includes a resilient member (elastomeric pads) 19, fabricated from natural rubber or a similar elastomeric material, and a diaphragm 18, also fabricated from natural rubber or a similar elastomeric material. Resilient member 19 and the diaphragm 18 are assembled with a rotatable track assembly 15 in a fluid tight manner to form the primary and secondary fluid chambers 14, 16. Resilient member 19 includes a rigid metal support 13.

Mount 10 further includes a first and a second attachment device 74, 76 disposed along a mount axis 62 extending through the resilient hollow body 12 for receiving a load applied along the mount axis 62. In one embodiment, the first attachment device 74 of the mount 10 is in the form of a threaded stud 64 extending from a base 78 that is bonded to the resilient hollow body 12. The second attachment device 76 of the mount 10 is also a threaded stud 66 extending from a cup shaped mount housing 72 attached to the resilient hollow body 12.

Figure 3:
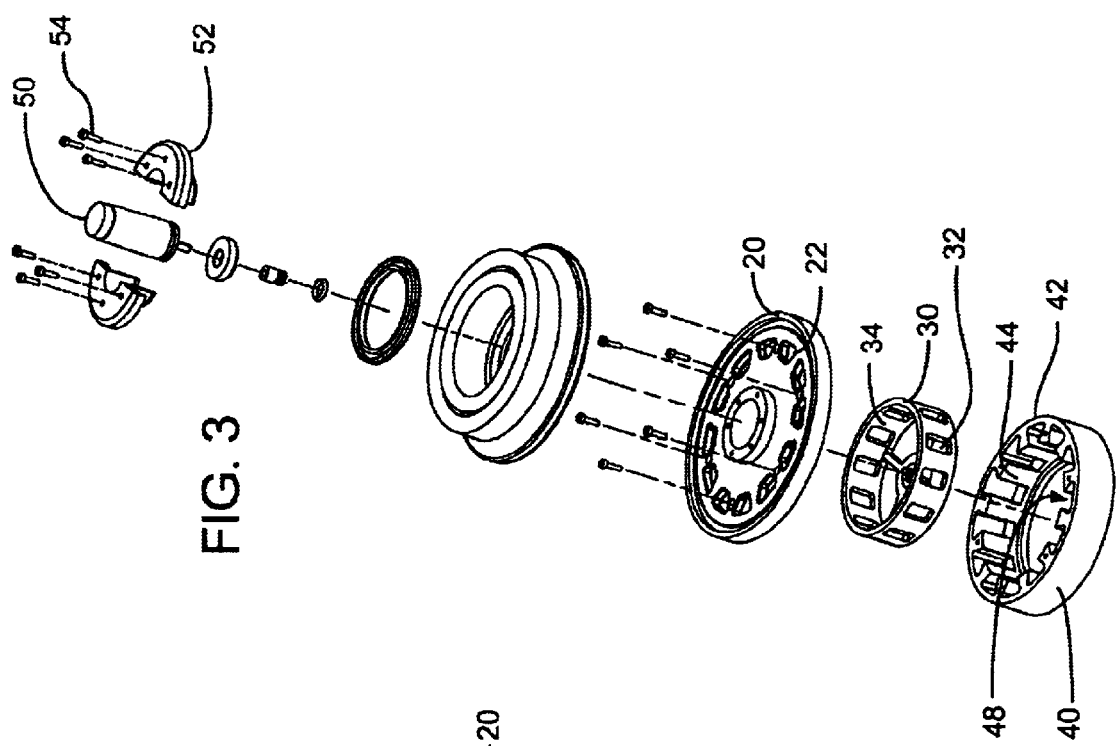
FIG. 3 is an exploded view of the rotatable track assembly illustrated in FIG. 2.
Figure 2:
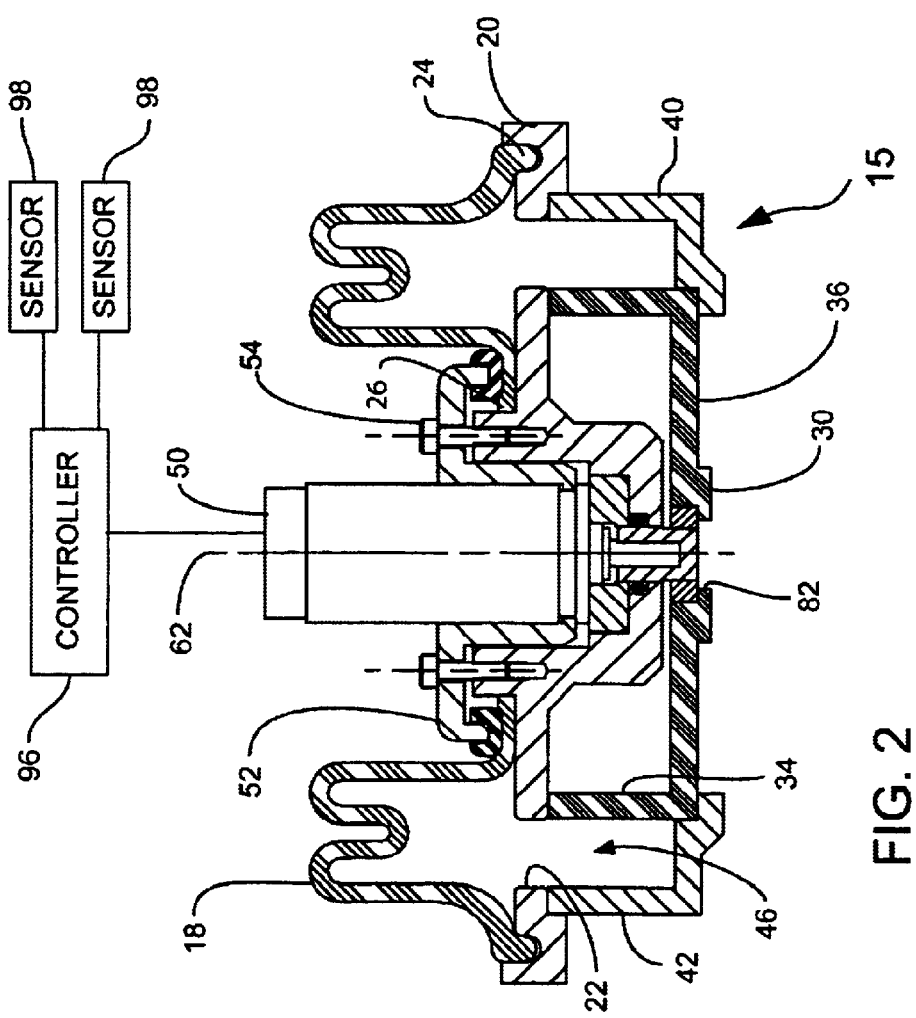
FIG. 2 is a detailed cross-section of one embodiment of a rotatable track assembly utilized in the hydraulic mount of FIGS. 1A and 1B.

FIGS. 2 and 3, illustrate in detail, one embodiment of rotatable track assembly 15 of mount 10 shown in FIG. 1. Rotatable track assembly 15 includes orifice plate 20, rotary track 30, containment plate 40 and rotary actuator 50. Rotatable track assembly 15 provides fluid communication between primary and secondary fluid chambers 14, 16.

Orifice plate 20 is disposed between mount housing 72 and resilient member 19. Orifice plate 20 includes a plurality of openings 22 for fluid communication between primary fluid chamber 14 and containment plate 40. The orifice plate design allows a large flow area for the hydraulic fluid used in the mount which results in the generation of low dynamic stiffness over a large frequency of operaton for one state of operation of the mount 10.

Containment plate 40 is securely attached to orifice plate 20. In one embodiment, containment plate 40 is securely attached to orifice plate 20 by screws. Containment plate 40 includes wall 42. Wall 42 includes a plurality of radially extending tabs 44. The radially extending tabs 44 define a plurality of fluid chambers 46. Fluid chambers 46 are three sided, the sides defined by wall 42 and tabs 44 of the containment plate 40. Fluid chamber 46 includes an opening 48 that allows fluid communication between the containment plate 40 and the secondary fluid chamber 16 via the rotary track 30 when the rotary track 30 is in the open position, FIG. 1B.

Rotary track 30 is rotatably disposed between orifice plate 20 and containment plate 40. Rotary track 30 includes a sidewall portion 34 and a base portion 36. Sidewall portion 34 defines a plurality of openings 32. Base portion 36 defines a plurality of openings 38. Openings 32 and 38 allow for flow between the secondary fluid chamber 16 and fluid chambers 46 of containment plate 40 when the rotary track is in the open position, FIG. 1B. The number and size of openings 32 of rotary track 30 correspond to the number size of the openings 48 of fluid chambers 46 of containment plate 40. Those skilled in the art will recognize that the number and size of the openings 22, 32 and 48 within their respective structures may be varied as required to suit the specific application.

Rotary track 30 also includes axial opening 82 through which rotary track 30 is operably connected to rotary actuator 50. In the embodiment of the mount 10 shown in FIG. 2, rotary actuator 50 is mounted in an actuator mount 52 attached to orifice plate 20 via fasteners 54. Rotary actuator 50 is operably connected to a controller and is sealed from operation of the rotatable track. The controller determines vibration frequencies through sensors 98 operably connected to the controller and rotates the rotary actuator 50 to rotate the rotary track 30 to the open or closed position in response to the sense vibration frequencies. Those skilled in the art will recognize that, in other embodiments, the rotatable track is continuously variable in position allowing for the track to remain partially open or closed depending on the vibrational input received by the controller from sensor located on the vehicle.

Diaphagm 18 includes an outward radius 24 and an inward radius 26. Outward radius 24 is disposed between the mount housing 72 and the orifice plate 20. Inward radius 26 is disposed between actuator mount 52 and orifice plate 20.

Those skilled in the art will recognize that there are various other configurations for restraining diaphragm 18 in order to form the secondary fluid chamber 16.

In operation, the dynamic stiffness of the mount 10 can be changed from a low rate to a high rate through electronic means by using the rotary actuator 50. In the open position of the rotary track 30, illustrated in FIG. 1B, there is fluid communication between the primary and secondary chambers, 14, and 16 via the alignment of rotary track openings 32 with containment plate openings 48 as illustrated by fluid flow pathway A. With this alignment of the openings, there is no resistance to the fluid flow between the fluid chambers. As a result, the force generated by the mount to any input displacement is due to the shear and compression of the elastomeric resilient member 19. Therefore, in this soft mode of operation (i.e. the open position), the elastomeric resilient member 19 is relatively easily deflected, with fluid being pumped through the fluid path between the primary and secondary chambers. This mode of operation provides a low dynamic stiffness that is desirable for attenuating low amplitude vibrations.

When a higher rate of dynamic stiffness is desired, the fluid path between the primary and secondary fluid chambers may be closed. This fluid path is closed by rotating the rotary track 30 until the rotary track wall 34 aligns with openings 48, thereby blocking the flow of fluid between the primary and secondary fluid chambers. Blocking the fluid flow in this manner locks the incompressible fluid between the orifice plate and the resilient member 19. As a result, for any input to the mount 10, the volumetric change in the primary (pumping) chamber 14 is achieved by the bulging of the resilient member 19. This mode of operation provides a firm level of control for large amplitude inputs such as those from torque transient events.

Figure 4:
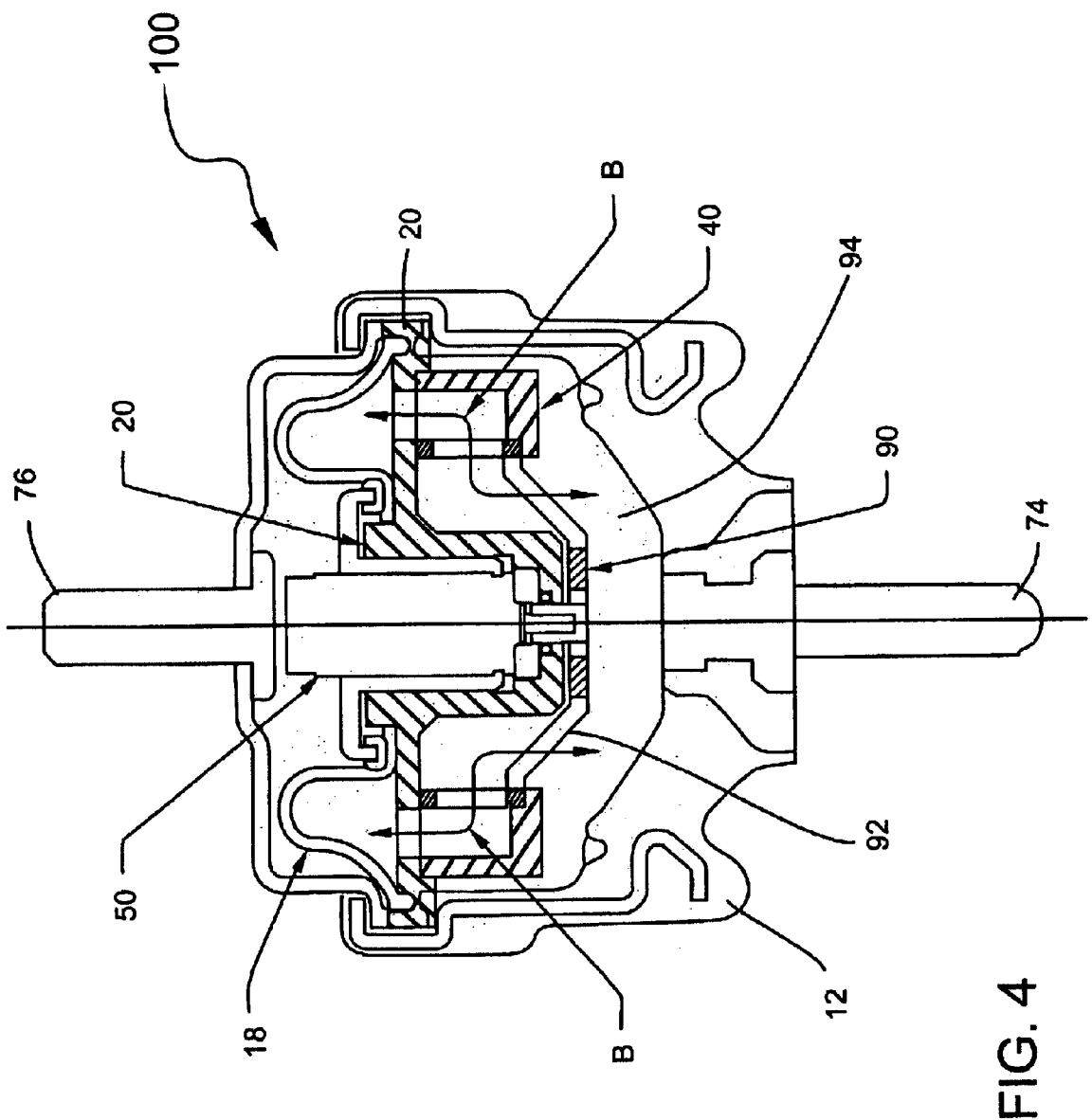
FIG. 4 is a cross section of a bi-state hydraulic mount illustrating another embodiment of a rotary track, in accordance with the present invention.

FIG. 4 shows a second embodiment of a mount 100, according to our invention, having a rotary track 90 of a different shape than the rotary track 30 shown in FIGS. 1A to 3. The second orifice track 90 of FIG. 4 includes a sloped base portion having angled openings 92 into the primary fluid chamber 94. The fluid flow pathway B of mount 100 is similar to the fluid flow pathway A of mount 10.

Those skilled in the art will recognize that the rotary actuator 50 can be energized at any time or frequency, to change the performance of the mount 10. Because actuation of the rotary track 30 is done actively, rather than passively, a mount 10 according to the invention offers greater flexibility of operation.

It will also be recognized, that although the embodiments disclosed herein use a simple two-state operation of the actuator 50 to completely open, or alternatively to completely close the fluid path, in other embodiments of our invention it may be desirable to utilize the actuator 50 for modulating fluid flow to thereby provide continuously variable control of the mount characteristics. It is contemplated that in other embodiments of the invention, it may be desirable to control the actuator 50 with a technique such as pulse width modulation.

While the embodiments of the invention disclosed herein are presently considered to be preferred, various changes and modifications can be made without departing from the spirit and scope of the invention.

For example, although the exemplary embodiments expressly disclosed herein utilize an electrically activated actuator 50, other types of actuators using power sources such as fluid pressure, vacuum, or mechanical force may also be used in practicing the invention.

The various elements and aspects of the invention may also be used independently from one another, or in different combinations or orientations than are described above and in the drawing with regard to the exemplary embodiment. It is expressly emphasized that the first and second attachment devices 74, 76 may take many other forms, and can be oriented at an angle to one another and/or the mount axis 62 to facilitate use of the invention in a wide range of applications. It is also expressly emphasized that the invention may be practiced in mounts providing resilient support of a wide variety of masses, in addition to the automotive engine mounts described herein.

The scope of the invention is indicated in the appended claims. It is intended that all changes or modifications within the meaning and range of equivalents are embraced by the claims.

We claim:

1. A hydraulic mount comprising:
   a resilient hollow body defining a primary fluid chamber and a secondary fluid chamber;
   a rotary track assembly separating the primary and secondary fluid chambers;
   a rotary actuator operably connected to the rotary track assembly;
   a controller operably connected to the rotary actuator; and
   at least one sensor operably connected to the controller for sensing vibrational amplitude,
   wherein the rotary track assembly comprises:
   an orifice plate including a plurality of openings;
   a containment plate securely attached to the orifice plate, the containment plate including a wall portion, the wall portion including a plurality of tab portions defining a plurality of fluid chambers; and
   a rotary track disposed between and rotatably coupled to the orifice plate and the containment plate, the rotary track including a wall portion and a base portion, the rotary track wall portion including a first plurality of rotary track openings and the rotary track base portion including a second plurality of rotary track openings; and
   wherein the controller receives a sensed vibrational amplitude from the at least one sensor and sends a signal to the rotary actuator to rotate The rotary track assembly based on the sensed vibrational amplitude.

2. The hydraulic mount of claim 1 wherein the resilient hollow body comprises:
   a diaphragm operably connected to the rotary track assembly to define the secondary fluid chamber; and
   a resilient member operably connected to the rotary track assembly to define the primary fluid chamber.

3. The hydraulic mount of claim 1 wherein the resilient hollow body comprises:
   a diaphragm including an outward radius disposed between a mount housing and the rotary track assembly and an inward radius disposed between an actuator mount and the orifice plate to define the secondary fluid chamber; and
   a resilient member coupled to the mount housing and the rotary track assembly to define the primary fluid chamber.

4. The hydraulic mount of claim 2 wherein the resilient member includes a rigid support.

5. The hydraulic mount of claim 1 wherein the rotary actuator is operably connected to the rotary track.

6. The hydraulic mount of claim 5 wherein the first plurality of rotary track openings of the rotary track wall portion are rotated to align with the plurality of fluid chambers of the containment plate to allow for fluid flow between the primary fluid chamber and the secondary fluid chamber.

7. The hydraulic mount of claim 5 wherein the rotary track is rotated to align the rotary track wall portion with the containment plate fluid chanbers to block the flow of fluid between the primary fluid chamber and the secondary fluid chambers.

8. The hydraulic mount of claim 1 wherein the base portion of the rotary track is sloped.

9. The hydraulic mount of claim 5 wherein the rotary actuator rotates the rotary track to partially block the flow of fluid between the primary fluid chamber and the secondary fluid chamber.

10. A hydraulic mount comprising:
    a resilient hollow body defining a primary fluid chamber and a secondary fluid chamber;
    an orifice plate including a plurality of openings separating the primary fluid chamber from the secondary fluid chamber;
    a containment plate securely attached to the orifice plate, the containment plate including a wall portion, the wall portion including a plurality of tab portions defining a plurality of fluid chambers;
    a rotary track disposed between and rotatably coupled to the orifice plate and the containment plate, the rotary tack including a wall portion and a base portion, the rotary track wall portion including a first plurality of rotary track openings and the rotary track base portion including a second plurality of rotary track openings;
    a rotary actuator operably connected to the rotary track and a controller; and
    at least one sensor operably connected to the controller for sensing vibrational amplitude.

11. The hydraulic mount of claim 10 wherein the resilient hollow body comprises:
    a diaphragm operably connected to the orifice plate to define the secondary fluid chamber, and
    a resilient member operably connected to the orifice plate and a mount housing to define the primary fluid chamber.

12. The hydraulic mount of claim 10 wherein the resilient hollow body comprises:
    a diaphragm including an outward radius disposed between a mount housing and a rotary track assembly and an inward radius disposed between an actuator mount and the orifice plate to define the secondary fluid chamber; and
    a resilient member coupled to the mount housing and the rotary track assembly to define the primary fluid chamber.

* * * * *